United States Patent [19]

Hoshino

[11] Patent Number: 5,938,280
[45] Date of Patent: Aug. 17, 1999

[54] ARM REST FOR SEAT

[75] Inventor: Akihiro Hoshino, Kanagawa-ken, Japan

[73] Assignee: Ikeda Bussan Co., Ltd., Kanagawa-Ken, Japan

[21] Appl. No.: 09/100,966

[22] Filed: Jun. 22, 1998

[30] Foreign Application Priority Data

Jun. 27, 1997 [JP] Japan ................................. 9-187686

[51] Int. Cl.⁶ ..................................................... B60N 2/42
[52] U.S. Cl. ................................. 297/216.13; 297/411.32
[58] Field of Search ........................... 297/411.2, 411.32, 297/452.18, 216.1, 216.13, 216.14, 411.3, 411.35, 411.38; 248/118, 223.41, 220.21, 225.11

[56] References Cited

U.S. PATENT DOCUMENTS

| | | |
|---|---|---|
| 4,040,665 | 8/1977 | Wallace et al. . |
| 4,270,798 | 6/1981 | Harder, Jr. . |
| 4,435,011 | 3/1984 | Hakamata . |
| 5,316,373 | 5/1994 | Markel . |
| 5,520,440 | 5/1996 | Lee . |
| 5,658,043 | 8/1997 | Davidson . |
| 5,676,421 | 10/1997 | Brodsky . |
| 5,720,525 | 2/1998 | Rumler . |

*Primary Examiner*—Milton Nelson, Jr.
*Attorney, Agent, or Firm*—Gary M. Nath; Nath & Associates; Harold L. Novick

[57] ABSTRACT

An arm rest for a vehicle seat includes a support bracket to be fixed to a seat back frame of the vehicle seat, the support bracket being formed with a groove at a rear edge side on an upper portion thereof; an arm rest main body rotatably supported to the support bracket; and an fitting pin to be provided so as to project from the seat back frame, the fitting pin is fitted into the groove formed in the support bracket. The fitting pin is moved backward together with the seat back frame along the groove of the support bracket when an impact stress in a direction where the seat back is inclined backwardly is applied to the seat back.

3 Claims, 4 Drawing Sheets

ARM REST FOR SEAT

BACKGROUND OF THE INVENTION

1. Field of the Invention

The present invention relates to an arm rest for a seat of vehicles, and more particularly, to an arm rest for a seat of vehicles which includes an arm rest main body rotatably attached to a seat back frame of the vehicle seat.

2. Description of the Related Arts

Conventionally, as shown in FIG. 1, a vehicle seat 1 comprises a seat cushion 2, and a seat back 3 which is provided at a rear end portion of the seat cushion 2 via a reclining mechanism 5 so as to be tilted forwardly and rearwardly. A side portion of the seat back 3 is provided with an arm rest main body 7 which is swungably rotated around a pivot pin 9 provided on a support bracket 8.

However, in a structure where the support bracket 8 of the arm rest main body 7 has been provided on the seat back 3, a frame strength of the seat back 3 is much increased. For this reason, when an impact stress is applied, it is impossible to easily deform the seat back 3 of the vehicle seat 1 notwithstanding that the deformation of the seat back 3 is required. Further, in right and left sides of the seat back 3, the strength of a side where the support bracket 8 is provided is more increased than other strength of the other side of the seat back 3. For this reason, the strengths of the right side and the left side in the seat back 3 are not uniformly obtained. In other wards, the uniform deformation between the right and left sides in the seat back 3 is not obtained. Therefore, the comfortability for a person who sits on the seat is decreased.

SUMMARY OF THE INVENTION

The present invention has been achieved with such points in mind.

It therefore is an object of the present invention to provide an arm rest for a seat where a frame strength of a seat back of the seat is prevented from being increased notwithstanding that the seat back is provided with support brackets of the arm rests in right and left sides so that the seat back is easily deformed when the seat back of the vehicle seat receives an impact stress or the like.

It is another object of the present invention to provide an arm rest for a seat where strengths of the right side and the left side in the seat back are uniformly obtained so that the uniform deformation between the right and left sides in the seat back of the seat is obtained when the seat back of the vehicle seat receives the impact stress notwithstanding that the seat back is provided with a support bracket of the arm rest at only right side or at only left side of the seat.

To achieve the object, according to a first aspect of the present invention, there is provided an arm rest for a seat, especially for a vehicle seat, comprising: a support bracket to be fixed to a seat back frame of the vehicle seat, the support bracket being formed with a groove at a rear edge side on an upper portion thereof; an arm rest main body rotatably supported to the support bracket; and an fitting pin to be provided so as to project from the seat back frame, the fitting pin is fitted into the groove formed in the support bracket; wherein the fitting pin is moved backward together with the seat back frame along the groove of the support bracket when an impact stress in a direction where the seat back is inclined backwardly is applied to the seat back.

According to the invention described in the first aspect, the support bracket fixed to the seat back frame is formed with a groove at the read edge side on the upper portion thereof. The fitting pin fitted into the groove is attached to the seat back frame. Thus, in a normal state, a strength of fitting the support bracket to the seat back frame is sufficiently secured. On the other hand, in the case where an impact stress pressed backward is applied to the seat back frame, the fitting pin of the seat back frame is easily disengaged from the groove on the upper portion of the support bracket. Therefore, the seat back frame falls or inclines backward, so that the impact stress can be effectively absorbed.

According to a second aspect of the present invention, as it depends from the first aspect, the groove is a slot.

According to the invention described in the second aspect, the support bracket fixed to the seat back frame is formed with a slot at the read edge side on the upper portion thereof. The fitting pin fitted into the slot is attached to the seat back frame. Thus, in a normal state, a strength of fitting the support bracket to the seat back frame is sufficiently secured. On the other hand, in the case where an impact stress pressed backward is applied to the seat back frame, the fitting pin of the seat back frame is moved along the slot on the upper portion of the support bracket. Therefore, the seat back frame falls or inclines backward, so that the impact stress can be effectively absorbed.

Further, according to a third aspect of the present invention as it depends from the first aspect, the groove is a notched groove having an opening at a rear portion side of the seat; and the fitting pin is disengaged from the notched groove of the support bracket so as to release the engagement of the fitting pin with the notched groove, and is moved backward together with the seat back frame, when the impact stress is applied to the seat back frame.

According to the invention described in the third aspect, the support bracket fixed to the seat back frame is formed with a slot at the read edge side on the upper portion thereof. The fitting pin fitted into the slot is attached to the seat back frame. Thus, in a normal state, a strength of fitting the support bracket to the seat back frame is sufficiently secured. On the other hand, in the case where an impact stress pressed backward is applied to the seat back frame, the fitting pin of the seat back frame is easily disengaged from the groove having the opening rear edge on the upper portion of the support bracket. Therefore, the seat back frame falls or inclines backward, so that the impact stress can be effectively absorbed.

Therefore, according to the present invention, the frame strength of the seat back is prevented from being increased even in the case of providing the support bracket of the arm rest main body on the seat back, and it is possible to easily deform the seat back of the vehicle seat when an impact stress or the like is caused.

Furthermore, according to the arm rest for a seat of the present invention, even in the construction where the seat back is provided with a support bracket of the arm rest at only right side or at only left side of the seat, strengths of the right side and the left side in the seat back are uniformly obtained, so that the uniform deformation between the right and left sides in the seat back of the seat is obtained when the seat back of the vehicle seat receives the impact stress.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 4A is a side view to explain a normal state; and FIG. 4B is a side view to explain the state when an impact stress is applied to the seat.

DETAILED DESCRIPTION OF THE PREFERRED EMBODIMENTS

Figure 1:
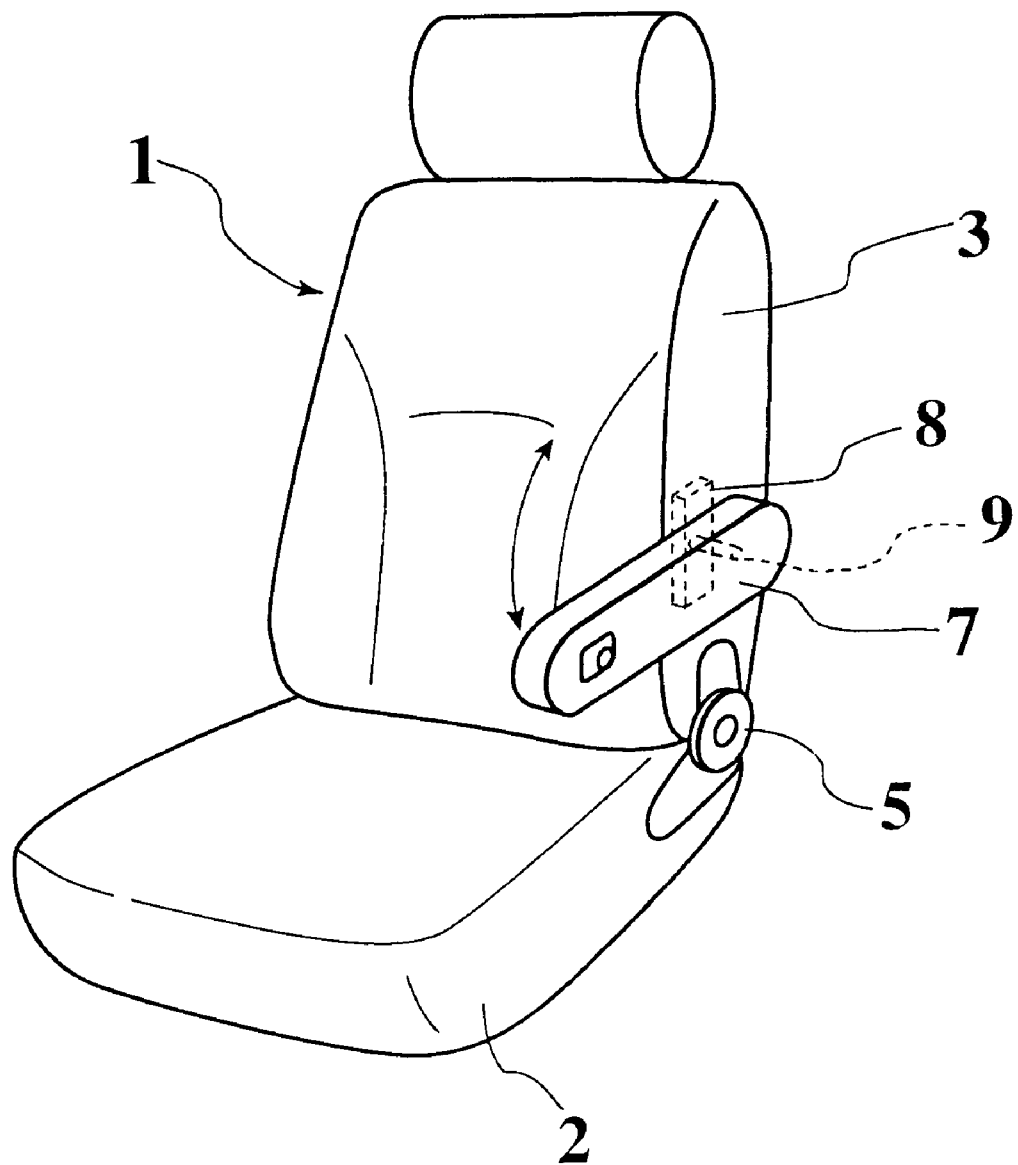
FIG. 1 is a perspective view showing a conventional arm rest for vehicles.

There will be detailed below the preferred embodiments of the present invention with reference to the accompanying drawings. Like members are designated by like reference characters.

FIG. 2 to FIG. 4A and FIG. 4B each shows an arm rest for vehicles according to an embodiment of the present invention. A vehicle seat 11 includes a reclining mechanism 15. The reclining mechanism 15 has a base 15a fixed onto a seat cushion side, and an arm 15b rotatably attached to the base 15a.

The seat back frame 13 is provided with an arm rest main body according to the present invention. The arm rest main body 21 is rotatably supported via a support bracket 31 fixed to the seat back frame 13. The support bracket 31 is fixed to the seat back frame 13 by means of a screw 17 together with the arm 15b of the reclining mechanism 15.

The support bracket 31 is formed by bending a sheet metal. Further, the support bracket 31 has a lower side portion which is formed as a fitting portion 31a to the seat back frame 13, and an upper portion which is formed into a stepped portion as a support portion 32 of the arm rest main body 21. The fitting portion 31a is formed with fitting holes 31b at two of front and rear locations thereof. Moreover, the support portion 32 is formed with a fitting hole 34 at the substantially center portion thereof, and a guide pin 35 outwardly projecting therefrom.

Figure 2:
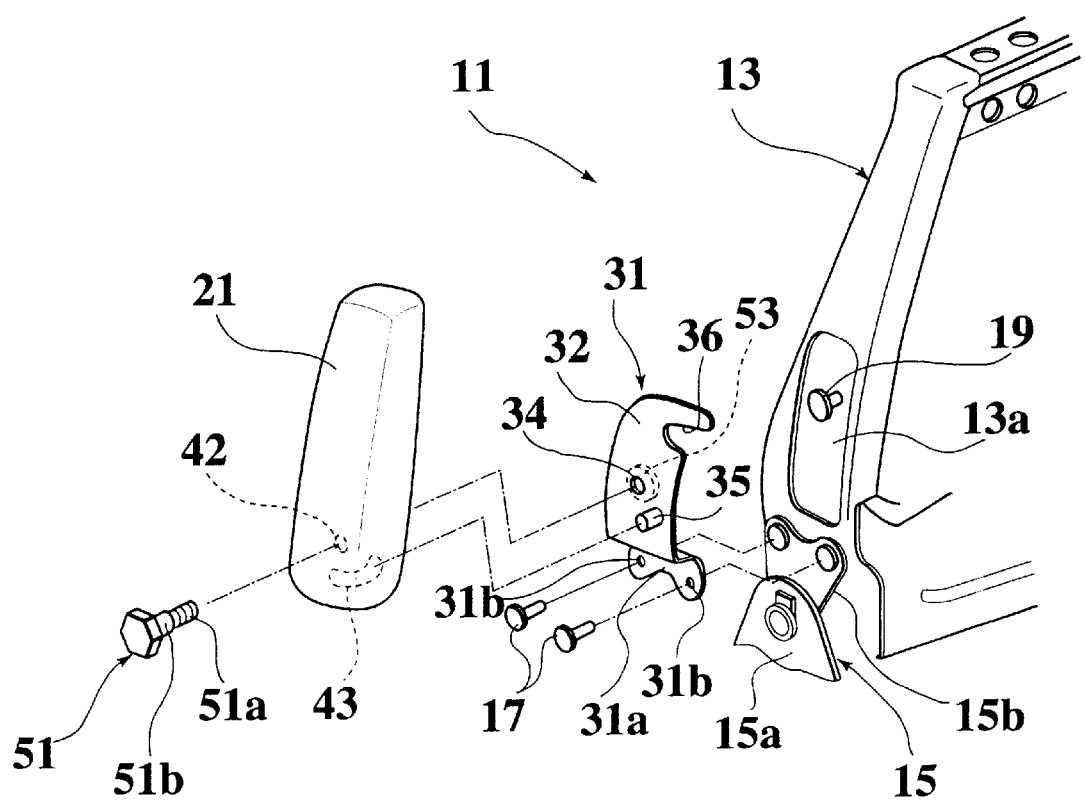
FIG. 2 is an exploded perspective view showing an arm rest for vehicles according to an embodiment of the present invention.
Figure 3:
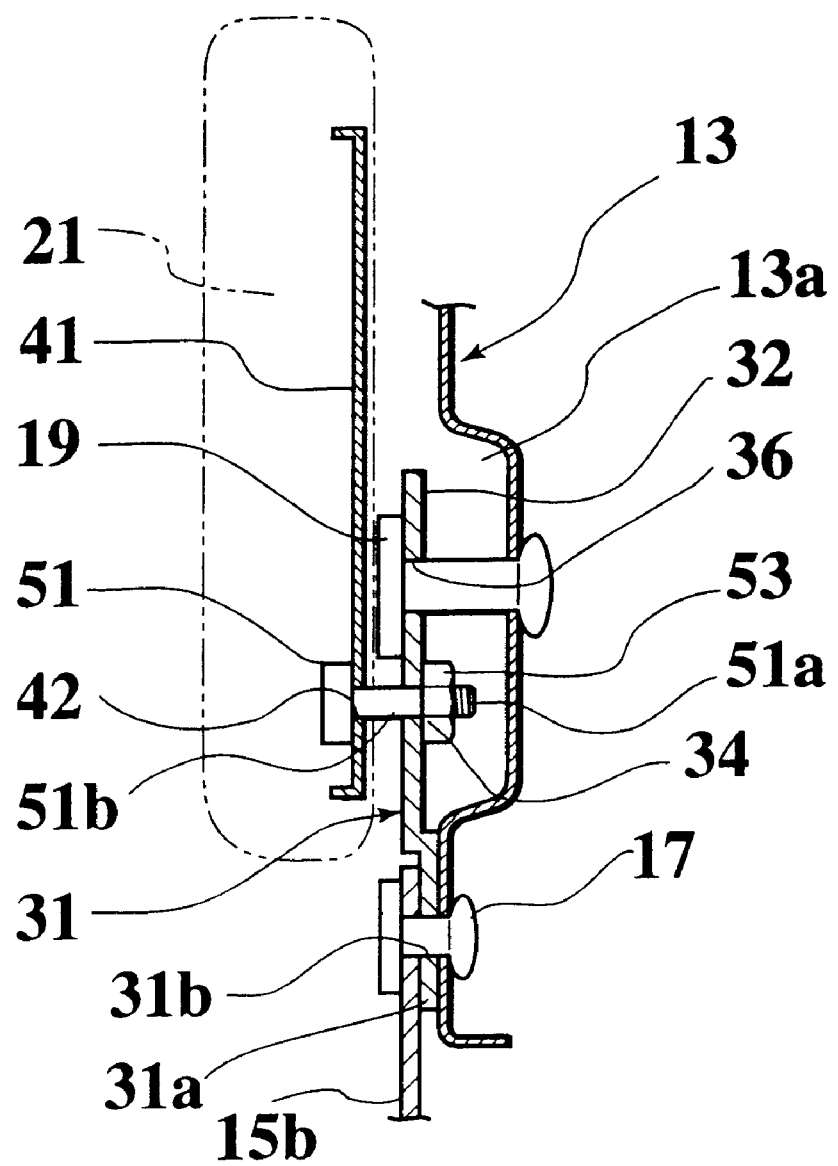
FIG. 3 is a cross-sectional view showing the arm rest for vehicles according to an embodiment of the present invention.

The arm rest main body 21 has an arm rest frame 41 made of a rigid material such as metal or the like. The arm rest frame 41 is formed with a hole 42 so as to abut against the support portion 32 of the support bracket 31 and to be rotatably supported as shown in FIGS. 2 and 3. Further, the arm rest main body 21 is formed with an arc-like shaped guide groove 43 for guiding the arm rest frame 41 along the guide pin 35 of the support bracket 31.

A shaft bolt 51, which functions as a rotary shaft of the arm rest main body 21, is inserted into the hole 42 of the arm rest frame 41 and the fitting hole 34 formed in the support bracket 31, and thereafter, is fastened by a nut 53.

More specifically, a screw portion 51a on the distal end side of the shaft bolt 51 is fastened by means of the nut 53 in the fitting hole 34 of the support bracket 31. On the other hand, a cylindrical portion 51b of the shaft bolt 51 is fitted into the hole 42 of the arm rest frame 41. In the manner as described above, the arm rest main body 21 is rotatably supported to the support bracket 31.

Further, the support bracket 31 is formed with a groove 36 having an opening end on the rear edge side at the upper portion thereof. The seat back frame 13 is formed with a recess 13a as shown in FIGS. 2 and 3. A fitting pin 19 is provided on a side portion of the recess 13a of the seat back frame 13. The fitting pin 19 is fitted into the groove 36 having the opening rear end. Also, the groove 36 is not specially limited to a shape shown in FIG. 2, but may be a long slot or a merely groove. If the groove is long, it may be a slot having no opening at rear end thereof.

Figure 4A:
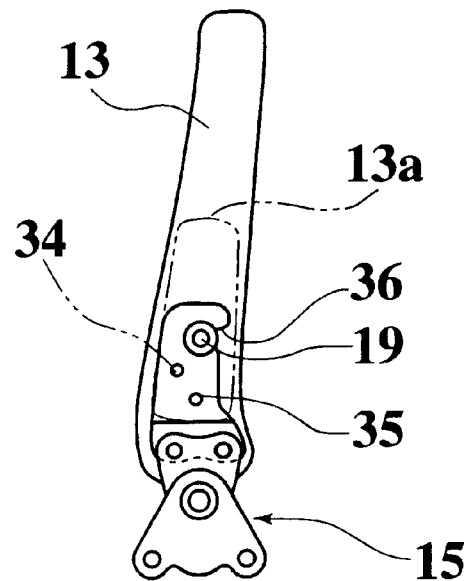
FIG. 4A and FIG. 4B each shows the arm rest for vehicles according to the embodiment of the present invention.
Figure 4B:
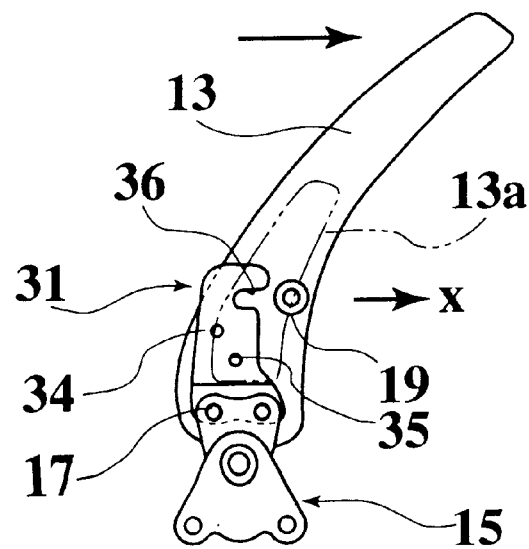

Thus, as shown in FIG. 4A, in a normal state, a strength of fitting the support bracket 31 to the seat back frame is sufficiently secured. On the other hand, as shown in FIG. 4B, in the case where an impact stress pressed toward a direction shown by an arrow I is applied to the seat back frame 13, the fitting pin 19 of the seat back frame 13 is moved from the groove 36 having the opening rear end of the support bracket 31 to a direction shown by an arrow X, and then, easily comes off therefrom. Therefore, the seat back frame 13 falls or inclines backward, so that the impact stress can be effectively absorbed. In FIG. 4A and FIG. 4B, in order to further clarify the aforesaid effect and operation, an illustration of the arm rest main body 21 is omitted.

The arm rest of the present invention can be applied not only to the vehicle seat, but also to an interior seat as a furniture and the like.

While preferred embodiments of the present invention have been described using specific terms, such description is for illustrative purposes, and it is to be understood that changes and variations may be made without departing from the spirit or scope of the following claims.

What is claimed is:

1. An arm rest for a seat, comprising:

a support bracket to be fixed to a seat back frame of the seat, the support bracket being formed with a groove at a rear edge side on an upper portion of the support bracket;

an arm rest main body rotatably supported to the support bracket; and a fitting pin to be fixed to the seat back frame of the seat so as to project from the seat back frame, the fitting pin being fitted into the groove formed in the support bracket; wherein the fitting pin is moved backward together with the seat back frame along the groove of the support bracket when an impact stress in a direction where the seat back is inclined backwardly is applied to the seat back.

2. The arm rest for a seat according to claim 1, wherein the groove is a slot.

3. The arm rest for a seat according to claim 1, wherein the groove is a notched groove having an opening at a rear portion side of the seat; and the fitting pin is disengaged from the notched groove of the support bracket so as to release the engagement of the fitting pin with the notched groove, and is moved backward together with the seat back frame, when the impact stress is applied to the seat back frame.

* * * * *